(12) United States Patent
Maliszewski et al.

(10) Patent No.: US 6,470,645 B1
(45) Date of Patent: Oct. 29, 2002

(54) METHOD FOR MAKING AND ERECTING A WIND TOWER

(75) Inventors: Leonard P. Maliszewski; Patrick C. Lashley, both of Shreveport, LA (US)

(73) Assignee: Beaird Industries, Inc., Shreveport, LA (US)

( * ) Notice: Subject to any disclaimer, the term of this patent is extended or adjusted under 35 U.S.C. 154(b) by 0 days.

(21) Appl. No.: 09/716,118

(22) Filed: Nov. 9, 2000

(51) Int. Cl.[7] .............................................. E04H 12/08
(52) U.S. Cl. .................... 52/745.18; 52/40; 52/726.3; 52/726.4; 52/736.1
(58) Field of Search .......................... 52/745.17, 745.18, 52/726.3, 726.4, 736.1, 736.3, 296, 40, 651.07

(56) References Cited

U.S. PATENT DOCUMENTS

| | | | | |
|---|---|---|---|---|
| 415,324 A | * | 11/1889 | Greene | 52/726.4 |
| 449,977 A | * | 4/1891 | Stern | 52/726.4 |
| 1,553,158 A | * | 9/1925 | Henderson | 52/40 |
| 2,369,533 A | * | 2/1945 | Cohen | 52/726.3 X |
| 3,544,110 A | * | 12/1970 | Dickinson | 52/40 X |
| 3,768,016 A | * | 10/1973 | Townsend et al. | 52/245 X |
| 3,793,794 A | * | 2/1974 | Archer et al. | 52/726.3 X |
| 4,272,929 A | | 6/1981 | Hanson | |
| 4,935,639 A | | 6/1990 | Yeh | |
| 4,966,525 A | * | 10/1990 | Nielsen | 290/44 X |
| 5,333,436 A | * | 8/1994 | Noble | 52/726.3 |
| 6,173,537 B1 | * | 1/2001 | Davidsson et al. | 52/40 |

FOREIGN PATENT DOCUMENTS

| | | | | |
|---|---|---|---|---|
| BE | 511789 | * | 12/1953 | 52/726.3 |
| CA | 774805 | * | 1/1968 | 52/726.4 |
| FR | 1249399 | * | 11/1960 | 52/40 |

* cited by examiner

Primary Examiner—Laura A. Callo
(74) Attorney, Agent, or Firm—Buskop Law Group, P.C.; Wendy Buskop

(57) ABSTRACT

A method for making a tower for a wind generator made up of a plurality of cylindrical segments, a plurality of transition rings with at least one being frustro-conical, a plurality of L-shaped flanges and a T-shaped flange.

11 Claims, 8 Drawing Sheets

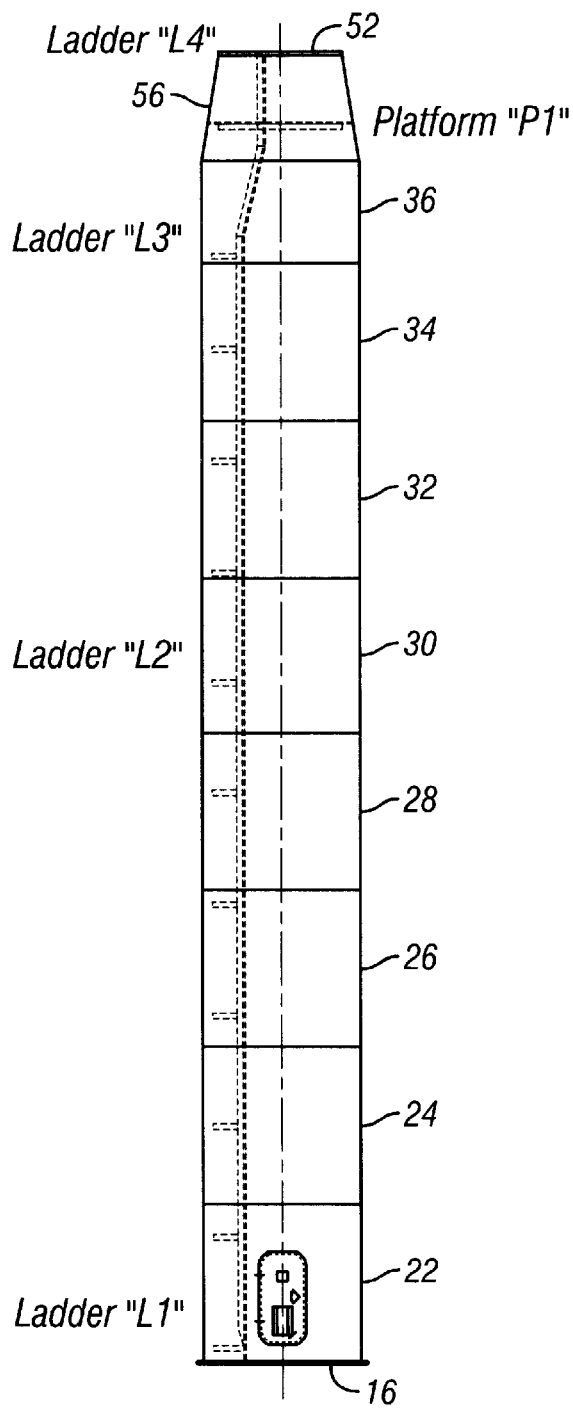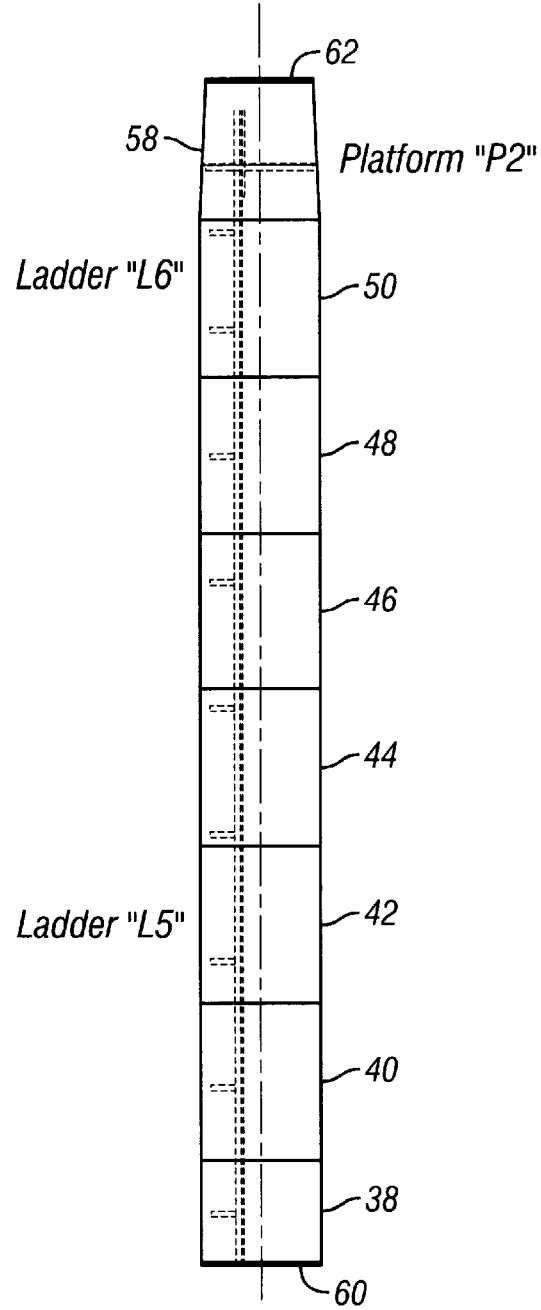

METHOD FOR MAKING AND ERECTING A WIND TOWER

BACKGROUND OF THE INVENTION

A great deal of interest is presently being shown in the development of alternative energy sources. One type of energy in which people are showing interest in is that from the wind. New and more efficient wind turbine generators are being developed, but these need to be placed on towers which are easy and economical to erect. The present invention relates to a novel method to build a wind tower which is more economical and faster to erect than existing wind towers.

Large towers, forty or more feet tall, are needed to support wind turbines in that the generators are heavy and the towers also need to withstand strong lateral forces caused by the wind. Other towers have been created which are segments of frustroconical sections welded together, which requires a lot of talent in the field to weld, hence making them expensive to acquire and build. Various towers have been described in recent patents such as U.S. Pat. No. 4,935,639 for a revolving power tower, and U.S. Pat. No. 4,272,929, both of which are incorporated by reference.

BRIEF SUMMARY OF THE INVENTION

This invention relates to the method of making a wind turbine tower.

The method of making the tower of this invention involves using a plurality of sections with each section being made from a series of rings. The rings are preferably welded together. The method uses rings, wherein each ring in a section has an identical outer diameter to the other rings for that section. This method of assembly uses at least two transition sections, at least one of which is frustro-conical and in the form of a ring. One T-shaped flange and two L-shaped flanges are also used in the method.

The present invention is a method for making a wind turbine tower comprising the following steps: (1) forming a first plurality of rings and assembling the first plurality rings into a bottom section having a first end and a second end, and wherein each ring in the first plurality of rings has an outer diameter identical to the outer diameter of the other rings in the bottom section; (2) forming a second plurality of rings and assembling the second plurality rings into an upper section having a first upper end and a second upper end, and wherein each ring in the second plurality of rings has an outer diameter identical to the outer diameter of the other rings in the upper section, (3) welding a T-shaped flange to the first end, (4) forming a transition ring and securing the transition ring to the bottom section using an L-shaped flange; (5) on said upper section, securing a second L-shaped flange to said first end, and a third L-shaped flange to said conical transition ring; (6) securing said bottom section to said upper section by connecting the L-shaped flanges.

BRIEF DESCRIPTION OF THE DRAWINGS

FIG. 4 shows the bottom section of a typical 50 meter, two section wind tower.

FIG. 5 shows the upper section of a typical 50 meter, two section wind tower.

DETAILED DESCRIPTION

The present invention relates to a method of assembling a wind tower which utilizes a stringent and detailed certifying body that specialized in wind towers.

The present method enables the construction of a tower which is tuned to the frequency of the wind turbine generator which is to be placed on the top of the tower.

The novel wind tower is constructed with an optimization program which determines the minimum plate thickness needed and structural components required to preclude vibration and harmonic build up in the tower created by the wind generator, while insuring strength in the tower.

The method for building this tower utilizes a unique optimization program to determine the exact thickness for each individual plate and resulting component used in the tower construction in order to both achieve minimum steel thickness, thereby reducing materials cost, the cost of transporting the tower, and the cost in man hours to cut the metal used in the tower construction, while maintaining structural integrity and overall strength in the tower. Each tower is also designed to various earthquake and wind parameters dictated by specialty certification-governing bodies.

For each tower, the novel method of construction includes as a step, an independent review and approval of the engineered characteristics of the tower by a specialty certification-body. In one embodiment, the tower and marine certification body of Germanischer Lloyd can be used. In another embodiment, the certification body, Det Norske Veritas of Denmark, could be used.

Figure 1:
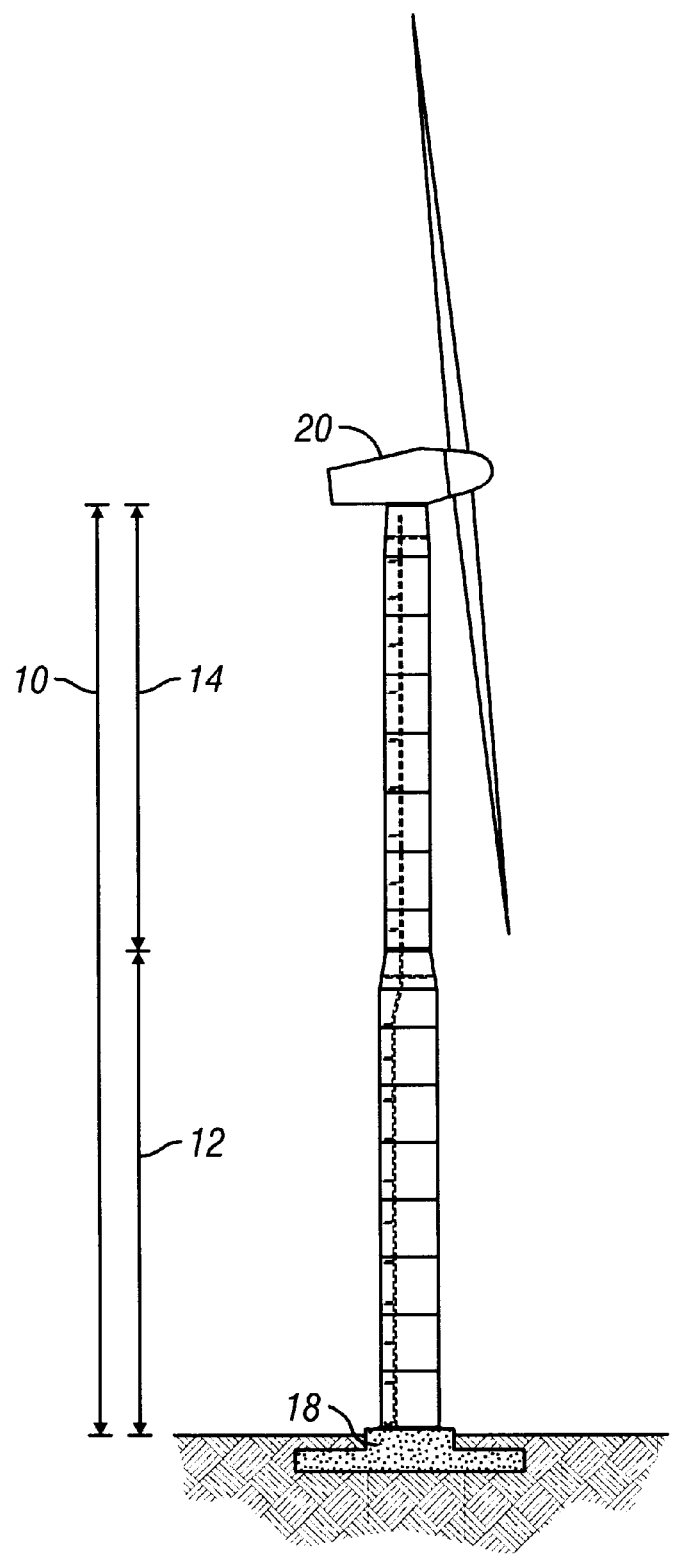
FIG. 1 is a side view of an erected tower embodying the method.

Referring now in detail to the figures, FIG. 1 shows a fifty-meter tower created with the novel method. The towers of this invention can range in height from 32 to over 80 meters.

For a 50-meter wind tower 10, two tubular sections, preferably cylindrical hollow sections can be used, specifically, a bottom section 12 and an upper section 14. The bottom section 12 is connected to a T-shaped flange 16, which is bolted to studs embedded in concrete foundation 18. The concrete foundation 18 may be used with threaded rods or other materials to anchor and hold the resulting wind tower erect against the overturning movement caused by the turbine mounted to the top when the wind is in excess of 100 mph. The wind tower 10 is designed to support a wind turbine generator 20. Any of a variety of generators could be used, such as pivoting, stationary, low horsepower, and high capacity wind turbines. The bottom section 12 and upper section 14 are preferably made from steel, such as cold rolled steel, but other suitable metals can be used as well, such as aluminum or metal alloys.

The bottom section 12 and upper section 14 are preferably constructed from a plurality of rings, each ring having the same outer diameter as the others in a section and which are used to make a section.

Figure 2:
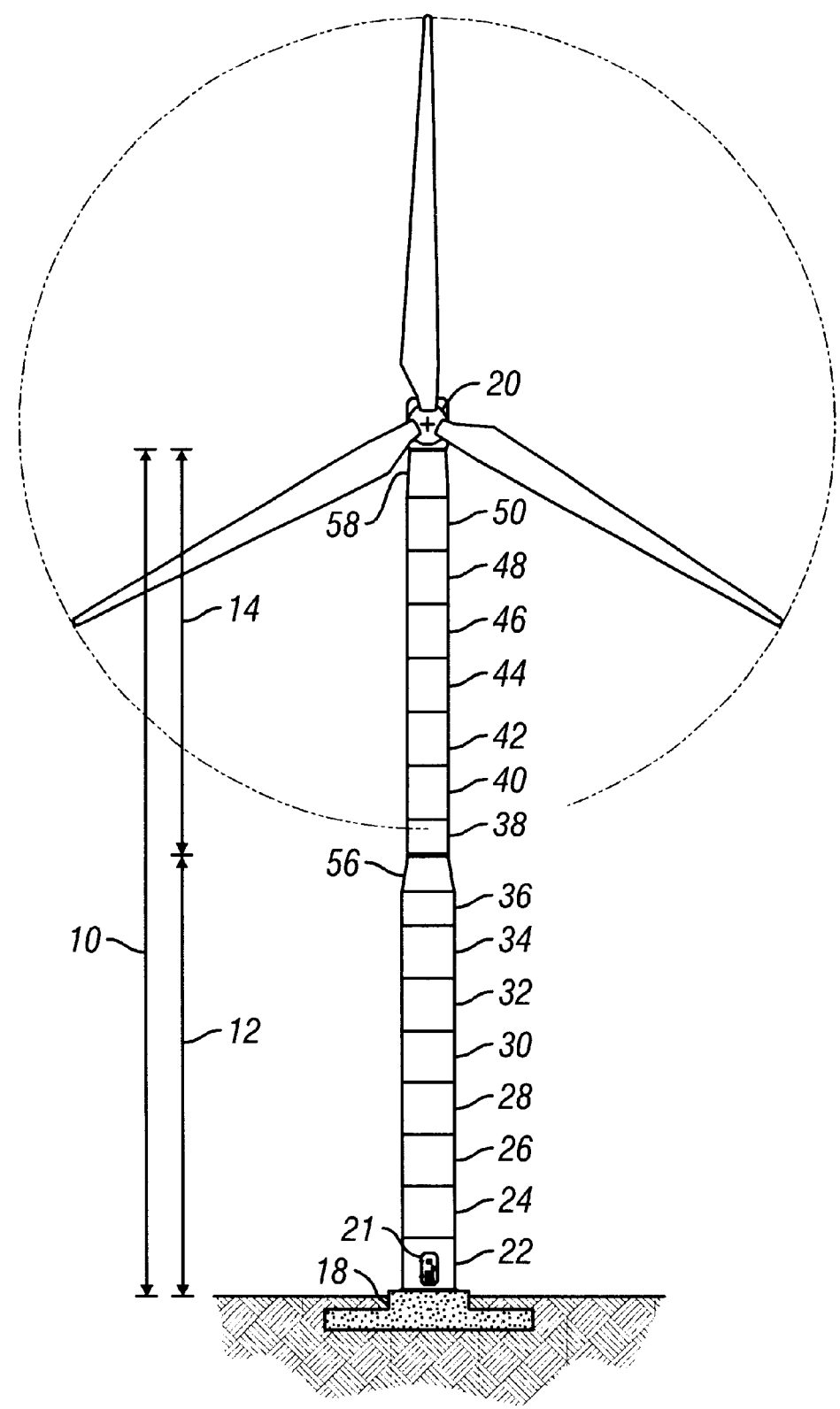
FIG. 2 is a front view of an erected wind tower erected with the method of construction.

In FIG. 2, the rings of the bottom section 12 include first bottom ring 22 which is welded to second bottom ring 24. Third bottom ring 26 is welded to both second bottom ring 24 and fourth bottom ring 28. The additional rings 30, 32, 34 and 36 are welded together in a like manner. The outer diameters of each ring used in the bottom section 12 are identical. The outer diameters of each ring, 38, 40, 42, 44, 46, 48, and 50 in the upper section 14 are identical to each other. However, the outer diameter of the rings of the bottom section 12 differs from the outer diameter of the rings in the upper section 14. The diameter of the rings of section 12 is up to approximately fifty (50%) larger than the outer diameter of the rings of section 14.

The rings for the bottom section and for the upper section shown in both FIGS. 1 and 2 are pre-welded at the factory site in the most preferred embodiment. However, it is within the scope of the invention to consider the step of welding the rings together for the sections at the tower site.

The overall size of the subsequently created sections is selected so that the sections can be transported from the factory to the site in the most economical manner and with the least amount of road permits. It is contemplated that a tractor-trailer or a train could be successfully used as a transport device to move the sections.

For larger towers, such as those 60 to 80 meters in height, a bottom section 12, and upper section 14 and middle section may be needed. In towers over 80 meters in height, four sections are contemplated, a bottom section 12, and upper section 14, and two additional sections. The additional sections can be bolted together with flanges or bolted to up to two additional conical transition rings. For towers with more than two sections, it is possible to omit using additional conical transition rings. If additional conical transition rings are used, then the conical transition rings would be welded onto the additional sections at the factory.

In the preferred embodiment, a door 21, is installed in the bottom section 14, to permits access to the interior of the tower for painting, bolt tightening or wind turbine maintenance purposes.

Figure 3:
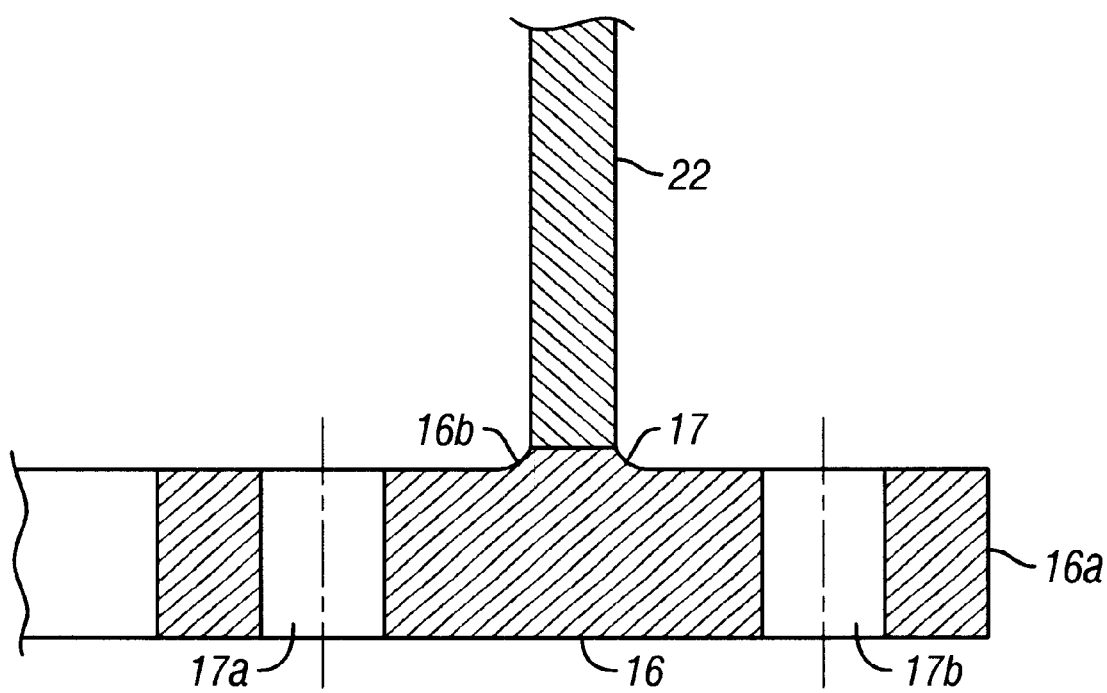
FIG. 3 shows the T-shaped flange which secures to the lowest part of a bottom section of a tower to a foundation.

FIG. 3 shows a welded T-shaped flange 16, of which stub 17 forms a part, located at the lower end of bottom section 12. Stub 17 aids in the alignment and welding of T-shaped flange 16 to ring 22. Bolt holes on inside and outside bolt circles in T-shaped flange 16 allows wind tower 10 to be secured to the anchor bolting of foundation 18.

FIG. 4 shows the bottom section 12, with the plurality of welded rings 22 and 36 and the first conical transition ring 56, welded to the bottom section 12.

FIG. 5 shows the upper section 14 made from a plurality of rings 38 to 50 having identical outer diameters. A second L-shaped flange 60 is welded to the bottom ring 38 of the upper section 14. On the top portion of upper section 14 a second conical transition ring is welded to cylindrical ring 50.

Both transition rings 56 and 58 are preferably reinforced in that they generally have thicker plates than the plates used on the adjacent rings 48 and 34. In addition, the L-shaped flanges 52 and 62, disposed on one side of each conical transition ring, give additional support for the stress load transfer from the wind turbine to the tower walls.

The transition ring 56 and conical transition ring 58 are hollow. Ring 58 can be a frustro-conical segment. The transition ring 56 can have a slightly larger diameter than the conical transition ring 58. These rings 56 and 58 are initially cut from flat plate, in a particular shape, a shape which is designed for the particular wind tower height needed. The cut plate is then rolled, and the ends are welded together, typically using submerged arc welding. The reinforcing of the conical transition rings can also be by welding a second plate to the interior of the conical transition ring.

For a 50-meter tower, a preferred assembly embodiment uses an outer diameter for the bottom section of 118 inches, and an outer diameter for the upper section of 90 and $15/16^{th}$ inches.

Figure 6:
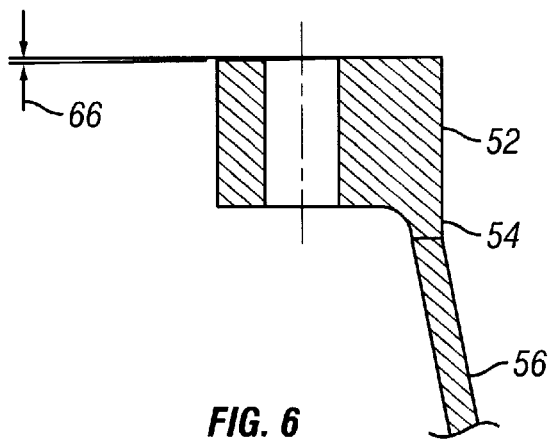
FIG. 6 is a cross sectional view of a first L-shaped flange 52 which secures to the upper part of the bottom section.
Figure 7:
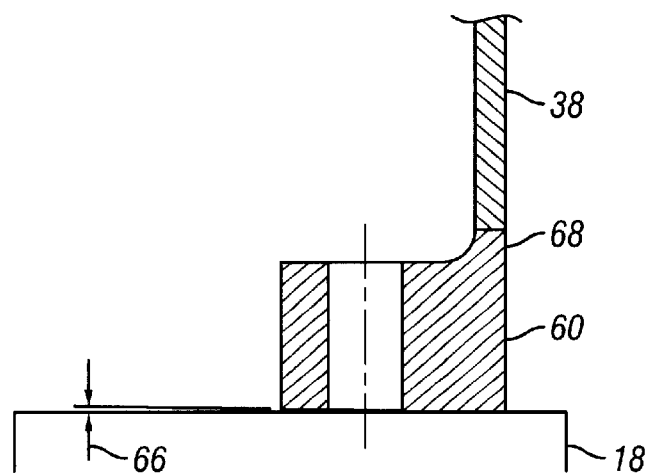
FIG. 7 is a detailed view of the second L-shaped flange 60, which secures to the bottom portion of the upper section.
Figure 8:
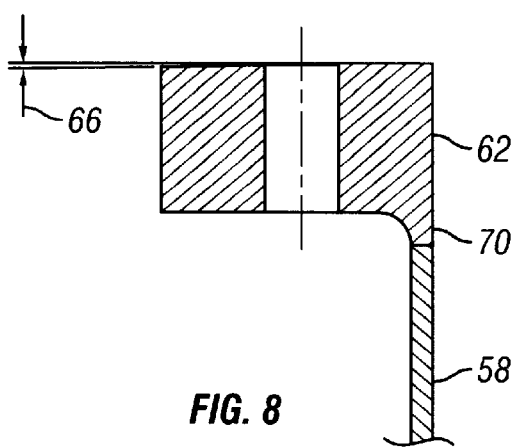
FIG. 8 is a cross sectional view of the third L-shaped flange 62, which secures to the upper part of the wind turbine generator.

A third L-shaped flange 62 is fitted to the top portion of the conical transition ring 58. A detail of the first L-shaped flange is shown in FIG. 6 and a detail of the second L-shaped flange is shown in FIG. 7. The third L-shaped flange is shown in FIG. 8. Each L-shaped flange has a sloping side 66 to compensate for warpage during welding.

In FIG. 6, the L-shaped flange 52 has a flange stub 54 and a sloped side 66. The transition ring is welded to the stub 64. The sloped side on the flange enables the flange to align with the ring when the stub 64 is welded.

In FIG. 7, the second L-shaped flange 60 is shown with the stub 68 and welded to the bottom ring 38 of the top section 12 with the sloped side 66.

Figure 9:
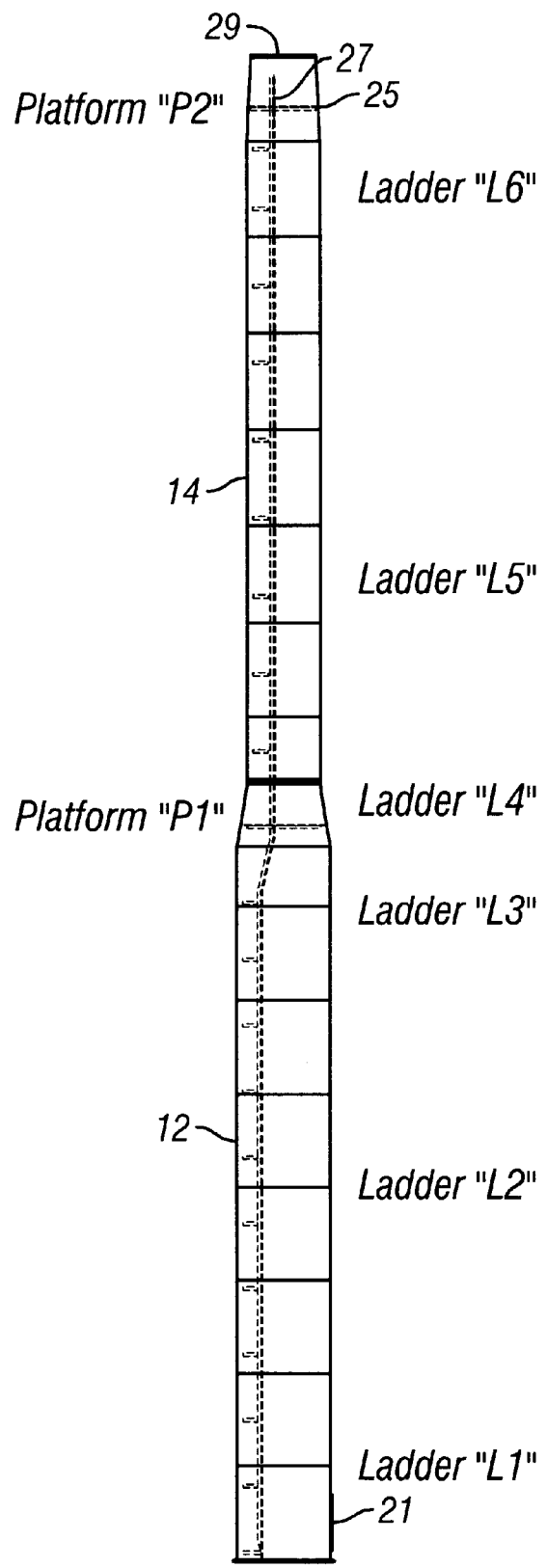
FIG. 9 is a view of the wind tower showing the ladder assembly and the platforms installed in the interior of the tower.

The method of assembly contemplates welding to the interior of the tower, a ladder assembly 27, as shown in FIG 9. The ladder is preferably made from of a polymer, PVC, fiberglass, plastic coated metal, laminate structure or combinations of materials. The ladder is spaced from the sides of the tower using supporting brackets, which enables maintenance people to use the interior of the tower and repair the wind turbine without the need for additional safety equipment, such as a safety harness. The ladders are typically used and constructed so that the back of the maintenance person is in close contact with the interior wall of the tower so that climbing occurs more safely than with other towers.

Returning to FIG. 1, it is preferred to pour a T-shaped concrete foundation 18 into a hole dug in the ground. Rebar may be included to strengthen the cement surrounding the tower. Studs (not shown) can extend from the concrete pad 18 on to which the T-shaped flange 16 welded to the bottom section 12 can be attached. The flange can be attached to the studs with bolts at another conventional means.

The concrete foundation 18 not only gives additional stability to the tower, but also assists in dampening the natural frequency vibrations caused by the wind to the tower.

At the top of the tower, a wind turbine generator is mounted on a platform. The wind turbine generator is installed on L-shaped flange 62 of top section 14. Pivot pins and conventional mounting means can be used to allow the wind generator 20 to face the wind direction. These mounting assemblies can typically be bolted to a platform secured to the top of the tower. Additionally, a middle platform can be installed at a midpoint or other point in the tower to create a platform from which maintenance work can be done.

FIG. 9 shows the interior of the wind tower 10, where one or more platforms 25 and 29 can be mounted. One platform 25 is installed at the top of the tower. The platforms 25 and 29 are bolted to studs welded to the tower.

The tower of this invention can be assembled in such a manner to allow only minimum personnel to erect the tower with no specialized welding required. The first step in such a procedure is to excavate a foundation site. It is assumed that the soil around the hole is compact, undisturbed soil, although an engineer prior to construction should generally verify soil conditions. In compact, undisturbed soil it is found that the best shape of the hole would be relatively narrow and deep, allowing the amount of cement used to be kept to a minimum, a T-shaped cement pad is preferred.

Studs are inserted in the concrete foundation prior to pouring concrete. The bottom section 12 is placed over the studs and the T-shaped flange 16 is bolted to the studs. The T-shaped flange 16 is preferably welded to the end of bottom section 12 at the factory to enable easy field installation. In addition, at the factory, a transition ring which may be cylindrical or conical is welded to the top of the bottom section 12, on the end opposite the T-shaped flange 16. At the factory, a first L-shaped flange is welded to the first conical transition ring 52, on the side opposite the bottom section 12.

Once the bottom section 12 is in place, the upper section 14 is now raised until it reaches the top of the transition ring. The upper section consists of a second L-shaped flange 52 welded to the bottom portion of the upper section. The second L-shaped flange 52 is then bolted to the first L-shaped flange in the field. No field welding is necessary to secure the bottom section 12 to the upper section. At the factory, the upper section 14 is constructed from welded rings. Also, a conical transition ring 58 is welded to the edge of the upper section 14 which is opposite the edge of the second L-shaped flange 60. The conical transition ring 58 has welded to it a third L-shaped flange 62. To this third L-shaped flange 62 is bolted the housing for the wind turbine.

Figure 10:
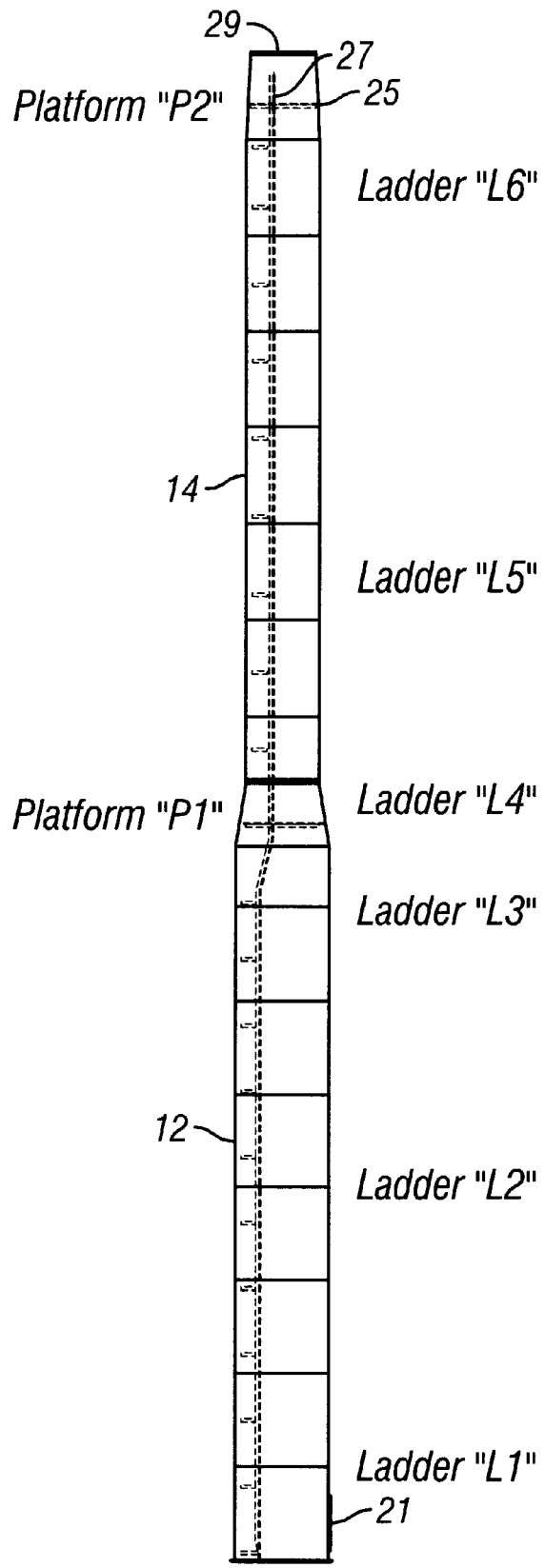
FIG. 10 is a view of an assembled 50 meter tower.

FIG. 10 shows the interior of the wind tower 10, where one or more platforms can be mounted. One platform 25 is installed at the top of the tower. The platforms are bolted to studs welded to the tower. The studs are welded to the interior of the tower at the factory prior to shipping the sections to the field. In the most preferred embodiment, the tower is shipped with the ladder and the platform already installed, so that there is minimal field assembly work.

Figure 11:
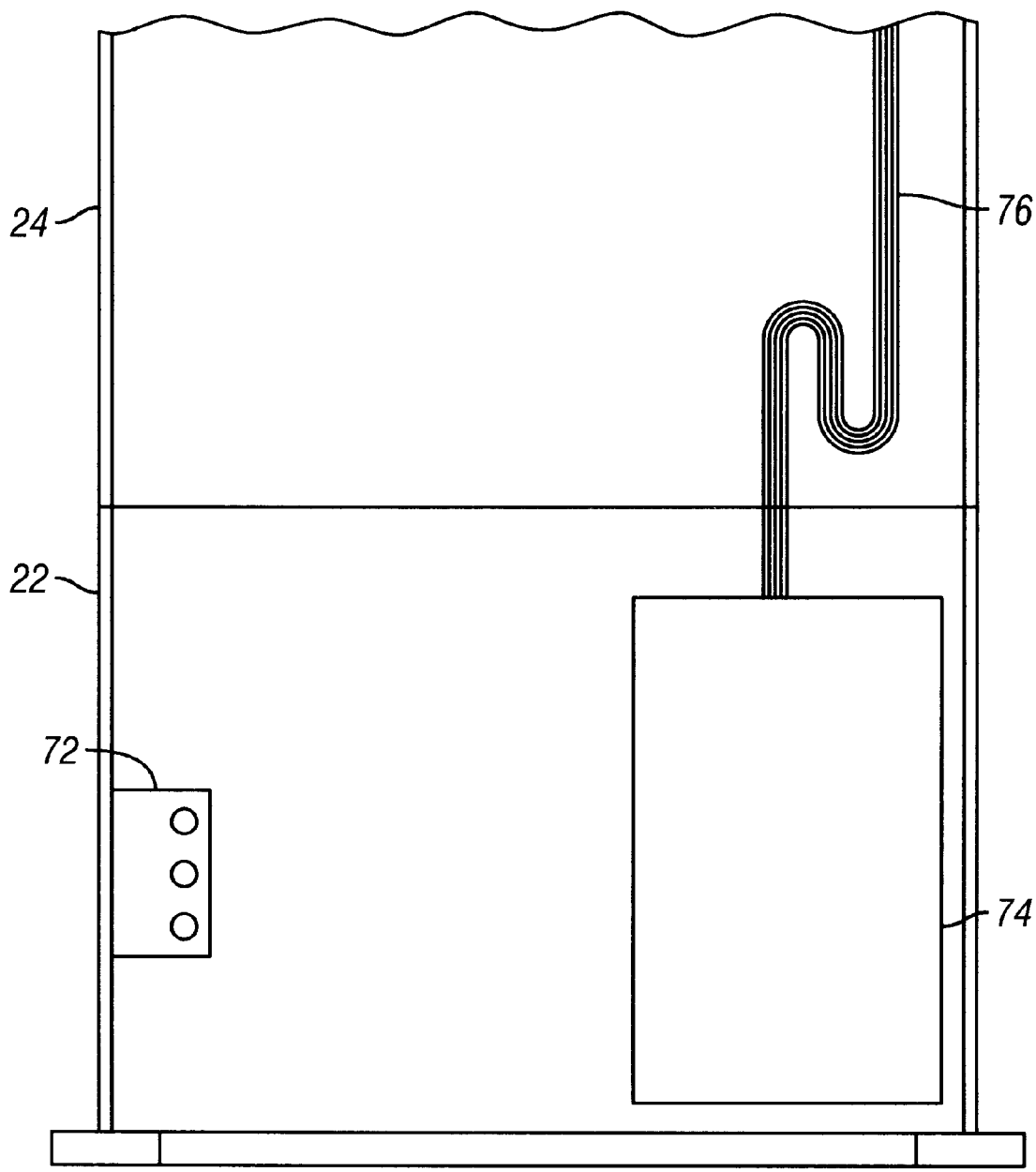
FIG. 11 is a detailed view of a grounding lug, a control box and the associated power and signal cables.

FIG. 11 shows the interior of the windtower 10, where one or more grounding lugs 72 can be installed to protect against lightening strikes. More particularly, the tower has a grounding lug 72, a control box 74 and the associated power and signal cables 76. Additionally, the method contemplates installing a control box 74 for the wind generator turbine located on the interior of the tower and connecting the power and signal cables 76 from the turbines to the control box 74. To insure that there is no destruction of the wind turbine generator, the tower supporting the generator must be sufficiently strong to withstand winds in excess of 100 miles per hour. Some tower designs may require conditions enduring winds of 160 mph.

It should be noted that by use of this invention, the tower could be varied after the initial machine is placed on it. If, for example, the user of the tower wishes to support a heavier load or perhaps a different machine requiring a different connection, all that need be done is to reverse the steps of assembly, lowering the machine and the various sections starting at the top until the section which is desired to be replaced is removed. For a different type of machine, all that may be required is removing the uppermost section and replacing it with a similar section having a different means for attaching the new machine to the tower. For a heavier machine, replacement may require changing the structure of the sections to strengthen them and may even require sawing off a portion of the lower section and re-drilling holes for the set screws so to vary the characteristics of that section.

The present invention contemplates installing a door in the bottom section. In the preferred embodiment, the door is a water resistant door, such as a door with an on capsulated gasket which can be locked.

The invention contemplates using cylindrical sections for the rings, but any shape having 1 to 12 sides can be used.

For a 50-meter tower, the method requires using seven rings for the bottom section with each ring having the exact same outer diameter dimensions. Eight rings are contemplated for use in the upper section.

The method also contemplates that the conical transition rings for the 50-meter tower should have a slope of up to 15 degrees.

The method may involve painting the tower with one coat of 20-year life paint to prevent corrosion.

What is claimed is:

1. A method for making a wind turbine tower comprising:
   forming a first plurality of rings having a first outer diameter;
   forming a second plurality of rings having a second outer diameter;
   welding together said first plurality of rings forming a bottom section having a first end and a second end;
   welding together said second set of rings forming an upper section having a first upper end and a second upper end;
   welding a T-shaped flange to said first end;
   welding a transition ring having a first edge and a second edge to said second end;
   welding to said first edge of said transition ring a first L-shaped flange;
   welding a conical transition ring having a first conical edge and a second conical edge to said second upper end:
      welding to said first upper end a second L-shaped flange;
      welding to said first conical edge a third L-shaped flange; and
      securing together said first and second L-shaped flanges.

2. The method of claim 1, wherein said first outer diameter is larger than said second outer diameter.

3. The method of claim 1, wherein said transition ring is frustro-conical is shape.

4. The method of claim 3, further comprising the step of painting the formed tower with 20-year paint.

5. The method of claim 3, comprising the step of installing at least one platform to an interior surface of said tower.

6. The method of claim 1, wherein said upper section and said bottom section are cylindrical in shape.

7. The method of claim 1, wherein said upper section and said bottom section are tubular.

8. The method of claim 1, further comprising inserting a door in said bottom section.

9. The method of claim 1, wherein said rings are constructed from metal plates which have been optimized in thickness to minimize destructive structural vibration and minimize construction costs.

10. The method of claim 1, further comprising the step of installing grounding lugs on said tower for grounding lightening.

11. The method of claim 1, further comprising installing power and signal cables connecting a wind turbine to a control box mounted in said tower.

\* \* \* \* \*